United States Patent [19]

Troy

[11] 4,114,465

[45] Sep. 19, 1978

[54] MODULATING FAILSAFE VALVE ACTUATOR USING DIFFERENTIAL GEARING

[75] Inventor: M. Frank Troy, Hinsdale, Ill.

[73] Assignee: Vapor Corporation, Chicago, Ill.

[21] Appl. No.: 749,195

[22] Filed: Dec. 6, 1976

[51] Int. Cl.² .......................................... F16H 27/02
[52] U.S. Cl. .................................. 74/89.17; 251/133; 185/40 R
[58] Field of Search ............... 74/710, 422, 424.8 VA, 74/89.17; 185/40 R; 251/133, 130

[56] References Cited

U.S. PATENT DOCUMENTS

| B 429,434 | 2/1976 | Burkhardt et al. | 74/424.8 VA |
|---|---|---|---|
| 3,279,744 | 10/1966 | Fieldsen et al. | 251/130 |
| 3,309,871 | 3/1967 | Kelly | 74/710 |
| 3,889,924 | 6/1975 | Karpenko | 185/40 R |
| 3,979,968 | 9/1976 | Ceccherini | 74/422 |

Primary Examiner—Benjamin W. Wyche
Assistant Examiner—Wesley S. Ratliff, Jr.
Attorney, Agent, or Firm—Francis J. Lidd

[57] ABSTRACT

A power operated rotary valve actuator utilizing a differential drive and magnetic clutch to provide continuous valve positioning between full open and full closed positions. The valve drive motor operates through a differential drive and in conjunction with a single electric clutch provides sequential application of rotational torque to a stored energy spring and the valve shaft. The sequential torque application minimizes drive system torque requirements and insures that sufficient energy is available to return the valve to a preselected position at any time during normal operation.

13 Claims, 2 Drawing Figures

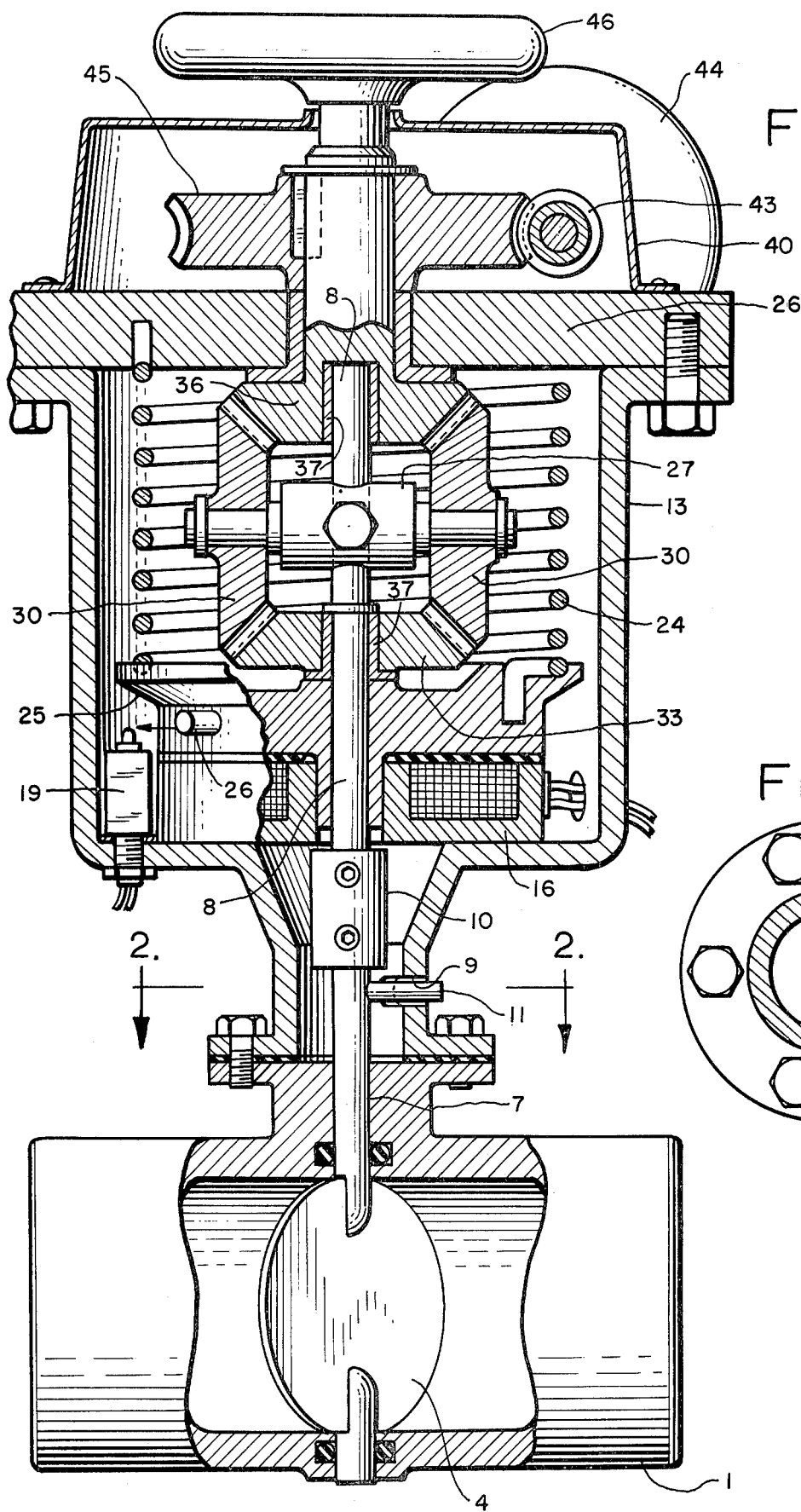

MODULATING FAILSAFE VALVE ACTUATOR USING DIFFERENTIAL GEARING

BACKGROUND OF THE INVENTION

This invention pertains to rotary valve actuators primarily utilized to provide remote operation for fluid control valves. Powered valve operation is further required for very large valves such as used in water supply or sewage treatment systems where manual operation is inconvenient and/or too slow for the system requirements.

Recent valve applications brought about by heightened interest in conservation of natural resources such as atmospheric air and the earth's bodies of water have dictated stringent reliability requirements. In particular, the capability of returning to a safe or predetermined closure condition is of great importance in modern valve actuator design.

Valve designs currently known and utilized are exemplified by U.S. Pat. Nos. 3,808,895, 3,430,916, and 3,279,744. The units disclosed all provide fail safe return to one position, that is full open or full closed, or the other. While this characteristic satisfies certain of the above mentioned requirements, there is need for a valve actuator which provides the fail safe return along with capability of continuous positioning of the valve shaft, or modulation of the valve output. An additional shortcoming of the above mentioned prior art valves is the requirement that the valve drive unit furnish sufficient torque to energize the storage unit and overcome the inherent valve operating resistance simultaneously. This characteristic places a substantially larger burden on the drive system and results in much larger drive hardware and/or reduced life of the drive components such as electric motors, hydraulic cylinders, or pneumatic cylinders. A further shortcoming of the above valves lies in the method of release provided for the stored energy component. In each case, mechanical devices such as rapid rise cams or seer mechanisms are utilized to provide release of the storage unit. Unfortunately, these components inherently result in high pressure metal contact with resultant rapid wear and short life or inaccurate release positions.

In view of the above, the invention disclosed here provides a fail safe valve actuator capable of continuously positioning the valve shaft and at the same time requiring only the force required to charge the storage systems or operate the valve. Therefore, it is not necessary to oversize the drive motor to provide adequate torque. In addition, the invention disclosed utilizes relative simple and wear resistant devices to contain the forces of the stored energy capsule, resulting in improved reliability of the overall unit.

SUMMARY OF THE INVENTION

A rotary valve actuator providing fail safe and allowing continuous positioning of the output shaft while maintaining capability for returning the valve stem to a preset or safe condition. The drive system employed utilizes a geared differential drive and an electromagnetic clutch to control the force and the energy stored in a mechanical spring helically compressed to a predetermined amount of force and stored energy. The drive system functions to compress the storage spring, energizing the clutch, thereby maintaining the required amount of energy to return the valve during an emergency situation. Continued energization of the clutch provides valve operation through the differential unit, such rotation being completely independent of the stored force and/or energy storage unit. The torque output of the drive system is therefore sequentially applied first to the energy storage spring and next to the valve operation, simultaneous torque requirements of the valve and the energy storage system are therefore avoided.

It is therefore the object of this invention to provide a rotary valve actuator providing fail safe return of the valve control element to a predetermined position, along with continuous positioning of the valve element.

A further object of the invention is to provide a fail safe valve actuator having an energy storage capsule which is energized to prior valve operation, thereby insuring capability of returning valve closure element to a safe or predetermined position from any valve setting.

A still further object of the invention is to provide a fail safe valve actuator capable of continuously positioning a valve shaft and modulating the valve closure element where the torque requirements of the storage capsule and valve operations are individually applied.

DETAILED DESCRIPTION OF THE INVENTION

FIG. 1 is an elevational view in partial section of the actuator disclosed shown mounted on a typical valve.

FIG. 2 is a sectional view of the actuator taken along lines 2—2 of FIG. 1.

Referring now to FIG. 1, the valve drive motor 44 disclosed here as a reversible capacitor start single phase AC motor operates a worm drive system consisting of gears 43 and 45. Although an electrical drive system is disclosed, it will be obvious to those skilled in the art that any other equivalent drive system such as a pneumatic cylinder rack and pinion, rotary air or hydraulic motor or other sources of rotational torque could be used as well. The pinion drive gear 45 is fixed to the upper gear 36 of a differential drive system consisting of additional gears 30 and the lower drive gear 33. The valve operator shaft 8 turns freely in the gear 36 by virtue of a bushing 37. Similarly, the shaft turns freely in the lower gear 33 and is coupled at its lower end to the valve shaft 7 through a coupling 10. A valve 1, having a closure member 4, is operated by the aforementioned valve shaft 7. An electromagnetic clutch 16 is positioned between the spring retainer 26 and the housing lower surface. A limit switch 19 is positioned inside the housing, so as to be actuated by a pin 26, attached to the retainer, after a predetermined amount of rotation of the retainer. A helical coil spring 24 is contained in the housing 13, surrounding the differential drive gears 33, 30, and 36. Ends of the of the spring as shown are retained in the upper housing and a spring retainer 25. The retainer is rotatably mounted around the shaft 8, as is the electromagnetic clutch 6. Energization of the clutch restricts relative rotation of the shaft 8 and retainer 25 when pin 11 abuts either end of slot 9. A limit switch 19 activates the clutch 16.

In operation spring 24, having sufficient pre-load, maintains pin 9 in abutment with either surface of slot 11. Initial activation of the motor 44 rotates gear 36. With the clutch de-energized, and shaft 8 stopped i.e., pin 9 in abutment with the end of slot 11, differential gear 30, drives gear 37 fixed to the spring retainer 25, helically "winding" the spring and storing energy. When the "winding" process has moved pin 26 so as to control switch 19, the clutch is energized preventing relative motion between retainer 25, and case 13. Intermediate shaft 27 fixed to the valve shaft 8 now essentially walks or rotates on the additional differential gears 30. Therefore, although relative rotation of the lower gear 33, the lower spring retainer 25, the clutch 16, and the actuator housing 13 is prevented by actuation of the clutch, the gear shaft member and valve closure element 14 operate freely as a function of the torque applied to worm drive gear 45. It will be appreciated by those skilled in the art that this characteristic of the differential now allows high resolution positioning of the valve closure member 4 while retaining the stored energy in the spring 24.

Should a loss of power occur or other unforeseen event resulting in the de-energization of the clutch 16 and loss of torque on the gear 45, relative motion between the lower spring retainer 25 and the magnetic clutch 16 is initiated due to the stored force and energy in the spring 24 in a direction which repositions the valve closure element in its initial position wherein pin 11 abuts the previously chosen end of the slot 9 as discussed above. It should be noted that as a torsional energy supplied to the spring 24 during the initial rotation which culminated in operation of the limit switch 19 was in excess of that required to turn the valve through a previously determined angular rotation; therefore sufficient energy and force is available to insure reliable return of the valve to its initial stop position under any conditions of modulation or valve operation.

Although the electrical circuitry required to initiate valve operation and provide the proper sequence of events to allow valve modulation after storing sufficient energy in the spring is not shown, the components required for this are well known in the valve art and will be easily understood by those skilled in the art. It should be further appreciated that although an electromechanical drive has been disclosed here, the upper differential gear 36 can easily be adapted to other sources of mechanical energy such as rack and pinion and a hydraulic or pneumatic cylinder, hydraulic torque motor, or pneumatic torque motor. These drives used in conjunction with electromagnetic valve to provide the necessary torque reversal will function equally as well. Furthermore, although a butterfly valve has been disclosed, it will be obvious to those skilled in the art that other types of fluid control valves employing closure elements such as a ball, plug, paper plug, or translating turret, are equally adaptable and will obtain the advantages of the invention disclosed.

Thus it is apparent that there has been provided in accordance with the invention a positioning valve actuator providing fail safe operation, and has fully satisfied the object aims and advantages set forth above. While the invention has been described in conjunction with specific embodiments thereof, it is evident that many alternatives, modifications, and variations will be apparent to those skilled in the art in the light of the foregoing description. Accordingly, it is intended to embrace all such alternatives, modifications, and variations as fall within the spirit and broad scope of the appended claims.

Therefore, I claim the following:

1. A valve actuator comprising;
   a reversible drive motor;
   means multiplying motor torque;
   a housing having upper and lower ends;
   a differential drive unit in said housing, having an input and output, and intermediate gears rotating on a shaft, said input connected to said multiplier;
   a valve operating shaft rotatably contained in said input and output gears, and fixed to said intermediate gear shaft;
   a helical coil spring in said housing having first and second ends, said first spring end fixed in said housing upper end;
   a spring retainer in said housing fixed to said spring lower end and said differential output;
   means signaling position of said retainer relative said housing and reversing said motor;
   an electromagnetic clutch responsive to said signal means, in said housing, intermediate said retainer and housing lower end, and adjacent said operating shaft, for releasably limiting motion relative said operating shaft and spring retainer;
   a stop, for selectively limiting rotation of said operating shaft relative said housing;
   wherein said drive motor and torque multipler rotate said retainer through said differential drive, said rotation relative said retainer and housing, compressing said spring; and,
   after a predetermined amount of rotation, actuating said clutch, and reversing said motor, providing normal valve operation;
   whereby loss of clutch power and drive torque will return said shaft to said stop.

2. The actuator described in claim 1, wherein said drive motor is an electromagnetic rotary motor.

3. The operator described in claim 1 wherein the drive motor and torque multiplying means are an electromagnetic rotary motor and a worm gear set.

4. The operator as described in claim 1 wherein said signal means is an electrical limit switch.

5. In a rotary mechanical actuator having a reversible drive motor and a motor torque multiplier for furnishing torque to an output shaft;
   a differential drive intermediate said multiplier and output shaft having an input and output;
   means storing drive motor energy intermediate said differential input and output shaft during prescribed motion relative said multiplier and shaft;
   means limiting output shaft travel providing said relative motion in one direction;
   means signaling output shaft travel in said one direction;
   means actuated by said signal selectively and releasably controlling said drive so as to lock said multiplier and shaft, and limit said relative motion;
   means actuated by said signal means reversing the drive motor;
   wherein the drive motor provides reversible output shaft torque over a prescribed shaft rotation and said storage provides unidirectional torque on release of said locking means, to return the shaft to a predetermined position.

6. The actuator described in claim 5 wherein the storage means includes a helical mechanical spring.

7. The actuator of claim 5 wherein said lock includes an electromagnetic clutch.

8. The actuator described in claim 5 wherein said reversible drive motor is an electromagnetic rotary motor and said torque multiplier is a worm gear drive.

9. A valve actuator comprising;
   a reversible drive motor;

means multiplying motor torque having an output shaft;

a housing having upper and lower ends;

a differential drive unit in said housing, having input and output gears, and intermediate gears rotating on an intermediate shaft, said input gear connected to said torque multiplier output shaft;

a valve operating shaft rotatably contained in said input and output gears, and fixed to said intermediate gear shaft, said operating and intermediate shafts essentially perpendicular;

a helical coil spring in said housing having first and second ends, said first spring end fixed in said housing upper end;

a spring retainer in said housing fixed to said spring lower end and said differential output gear;

means signaling position of said retainer relative said housing and reversing said motor;

means responsive to said signal means, in said housing, intermediate said retainer and housing lower end, for releasably limiting motion relative said operating shaft and spring retainer;

a stop, for selectively limiting rotation of said operating shaft relative said housing;

wherein said drive motor and torque multiplier rotate said differential input gear and said intermediate gear shaft rotates said operating shaft, contacting said stop and further rotating said retainer housing, thereby compressing said spring; and after a predetermined amount of compression, actuating said signal and motion limiting means, thereby reversing said motor, and providing normal valve operation;

whereby loss of clutch power and drive torque will return the output shaft to said stop.

10. The actuator of claim 9 wherein said drive motor and torque multiplier are an electromagnetic rotary motor and gear train respectively.

11. The actuator of claim 10 wherein said signaling means is an electrical limit switch.

12. The actuator of claim 9 wherein said motion limiting means is an electromagnetic clutch.

13. The actuator of claim 12 wherein said drive motor and torque multiplier are an electromagnetic rotary motor and gear train respectively.

* * * * *